(12) United States Patent
Lauri

(10) Patent No.: US 6,844,794 B2
(45) Date of Patent: Jan. 18, 2005

(54) HARMONIC MITIGATING FILTER

(75) Inventor: Pasi Matti Lauri, Littoinen (FI)

(73) Assignee: ABB Oy (FI)

( * ) Notice: Subject to any disclaimer, the term of this patent is extended or adjusted under 35 U.S.C. 154(b) by 0 days.

(21) Appl. No.: 10/266,455

(22) Filed: Oct. 8, 2002

(65) Prior Publication Data

US 2004/0066253 A1 Apr. 8, 2004

(51) Int. Cl.$^7$ ................................................ H03H 7/01
(52) U.S. Cl. ................................. 333/181; 333/12
(58) Field of Search .......................... 333/100, 172, 333/175, 181, 184, 12; 307/105; 363/44, 45, 46, 47

(56) References Cited

U.S. PATENT DOCUMENTS 1,852,125 A * 4/1932 Miessner .................... 333/100
5,093,641 A * 3/1992 Wolpert ..................... 333/181
6,009,004 A * 12/1999 Swamy ........................ 363/47
6,127,743 A 10/2000 Levin et al.

* cited by examiner

Primary Examiner—Robert Pascal
Assistant Examiner—Dean Takaoka
(74) Attorney, Agent, or Firm—Michael M. Rickin, Esq.; Paul R. Katterle, Esq.

(57) ABSTRACT

A filter for mitigating harmonics in an electrical distribution system. In one embodiment the filter has one winding that is connected to the power distribution system which may be a three phase system and capacitors are connected to other end of the winding in either a delta or y-connection. There is one tapping on the winding for connection to a load which may an adjustable speed drive. In another embodiment the filter has two or more separate reactors. In either embodiment a switch may be in series with the capacitors and capacitors may be connected in parallel with the series combination of switch and capacitors.

20 Claims, 4 Drawing Sheets

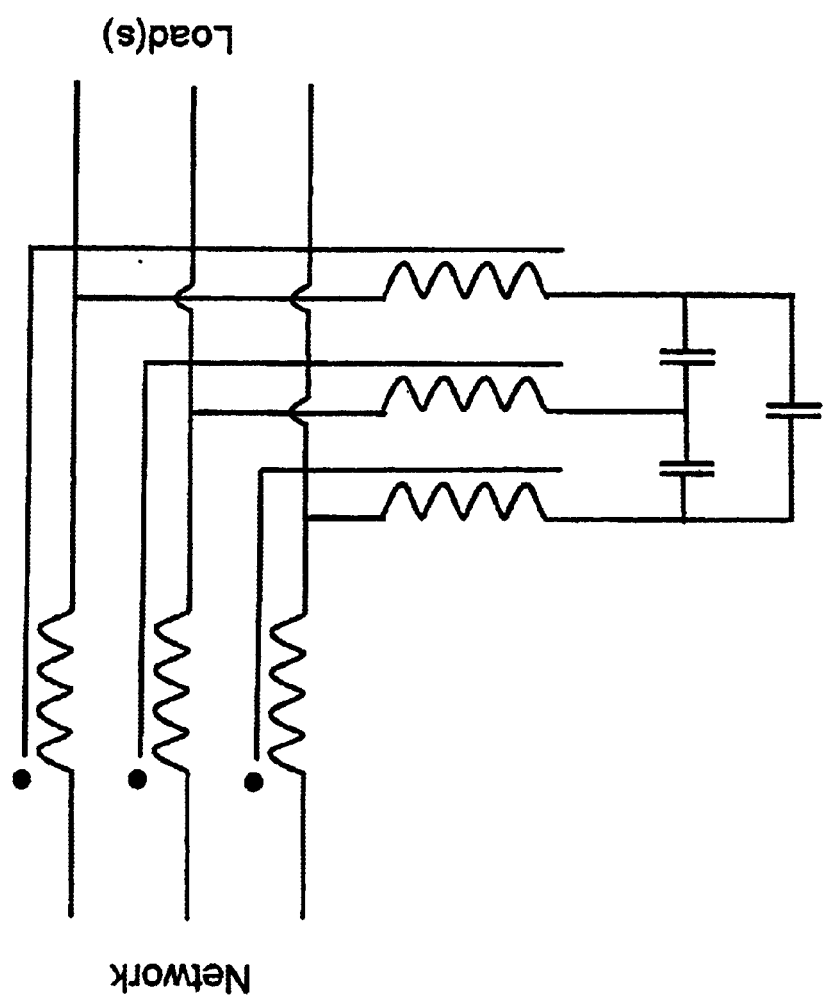

HARMONIC MITIGATING FILTER

FIELD OF THE INVENTION

This invention relates to electrical power distribution systems and more particularly to filters for mitigating harmonics in such systems.

DESCRIPTION OF THE PRIOR ART

Electrical distribution systems, for example for distributing an electrical power supply through a building or industrial facility, are often subjected to harmonic currents generated by non-linear loads such as electronic equipment (including computers, adjustable speed drives (ASD), uninterruptable power supplies (UPS), power rectifiers, etc.) and equipment that uses different kinds of arc processes (including arc discharge lighting systems). These harmonic-generating loads generate various levels of conventional harmonics (5th, 7th, 11th, 13th, 17th, 19th, 23rd, 25th etc.) and, for single phase line-to-neutral non-linear loads, also zero phase sequence or "triplen" harmonics (3rd, 9th etc.) in the power distribution system. The harmonic spectrum depends upon the nature of the harmonic-generating load.

The harmonic currents create many problems in the power distribution system, including increased voltage total harmonic distortion level, reduced electromagnetic compatibility of the loads, reduced reliability of the power distribution equipment, increased power losses, reduced power factor, and other problems which are well known to those skilled in the art.

Many systems have been proposed in the prior art for mitigating harmonic currents. These systems include power factor corrected power supplies, active filters which inject harmonic currents having a polarity opposite to that generated by the load, resonant L-C filters, ac chokes, and phase shifting systems. As is well known power factor corrected power supplies are expensive and have a limited application; active filters have a high cost, poor reliability and poor dynamic characteristics and may not be practical for use with large ASDs; resonant L-C filters have a high cost, poor effectiveness in low voltage systems and the tendency to cause the system to operate with a leading power factor; ac chokes have a high voltage drop across the reactors; and phase shifting systems are typically limited in the number of harmonic orders which can be mitigated and the degree of harmonic mitigation depends upon the extent to which harmonics produced by the various harmonic sources are identical and their phase shift angles.

U.S. Pat. No. 6,127,743 describes several embodiments for a harmonic mitigating filter that is connected between the power distribution system and the load which provides a flux shifting multiple-winding reactor with a capacitor bank connected between the reactor windings. All of the embodiments have one or more reactors and capacitors and include at least one compensating winding which has a polarity or orientation opposite to the polarity or orientation of the first line winding and at least one cross-link circuit that includes a capacitor.

SUMMARY OF THE INVENTION

A device for mitigating harmonic currents generated in a power distribution system by an AC load connected to the power distribution system. The device has a single winding having a first end for connection to the power distribution system and a second end; a capacitor having an input connected to the second end; and a first tapping on the winding for direct connection to the AC load.

A device for mitigating harmonic currents generated by a load connected to a power distribution system. The device has two or more separate windings electrically connected to each other, one of the two or more windings for connection to the power distribution system; a capacitor having an input connected to the other of the two or more windings; and a first tapping at the electrical connection for connection to the load.

In combination a power distribution system; and a device for mitigating harmonic currents generated in the power distribution system by an AC load connected to the power distribution system. The device comprises a single winding having a first end for connection to the power distribution system and a second end; a capacitor having an input connected to the second end; and a first tapping on the winding for direct connection to the AC load.

In combination a power distribution system; and a device for mitigating harmonic currents generated by an AC load connected to the power distribution system. The device comprises two or more separate windings electrically connected to each other, one of the two or more windings for connection to the power distribution system; a capacitor having an input connected to the other of the two or more windings; and a first tapping at the electrical connection for direct connection to the AC load.

DESCRIPTION OF THE DRAWING

FIG. 2a shows the capacitors C1, C2 and C3 of FIG. 2 connected in a delta connection or configuration.

DESCRIPTION OF THE PREFERRED EMBODIMENT (S)

Figure 1:
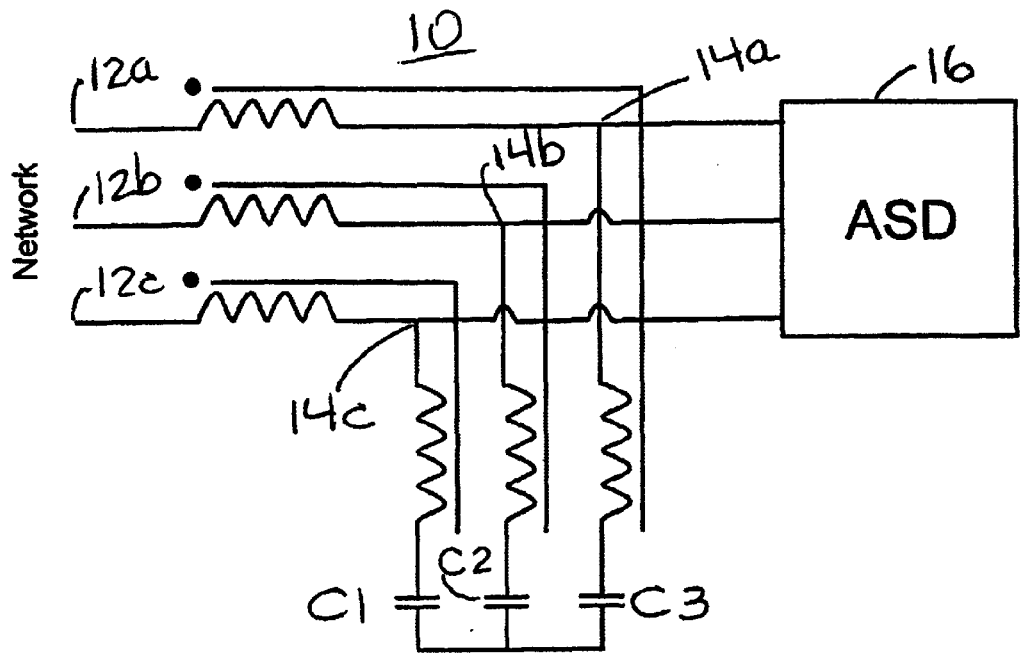
FIG. 1 shows a first embodiment for the harmonic mitigation filter of the present invention.

Referring now to FIG. 1, there is shown a first embodiment for the harmonic mitigation filter 10 for a three phase supply represented symbolically in FIG. 1 by the word "NETWORK".

Filter 10 is connected between the three phase supply and a load 16 which may for example be an ASD as is shown in FIG. 1.

Filter 10 has one winding 12 with several terminals. The three phase supply is connected to the start 12a, 12b and 12c of the winding and capacitors C1, C2 and C3 are connected to the end of the winding in either a delta or a y-connection. There is one tapping 14a, 14b and 14c for the loads.

Figure 5:
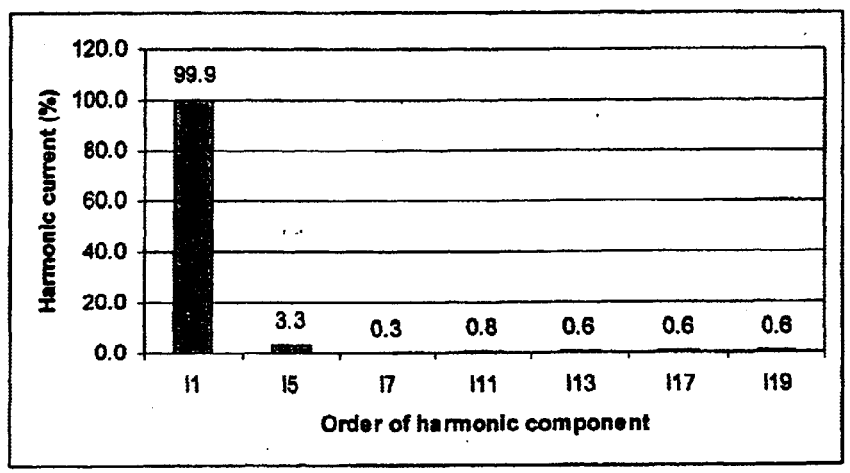
FIG. 5 shows the harmonic currents versus the order of the harmonics when the filter of FIG. 1 was tested.

Referring to FIG. 5, there is shown the percentage of harmonic current versus the order of the harmonic component when the filter 10 is tested with selected inductances and capacitances for a VSD load. The total harmonic current distortion is less than 5%.

Figure 2:
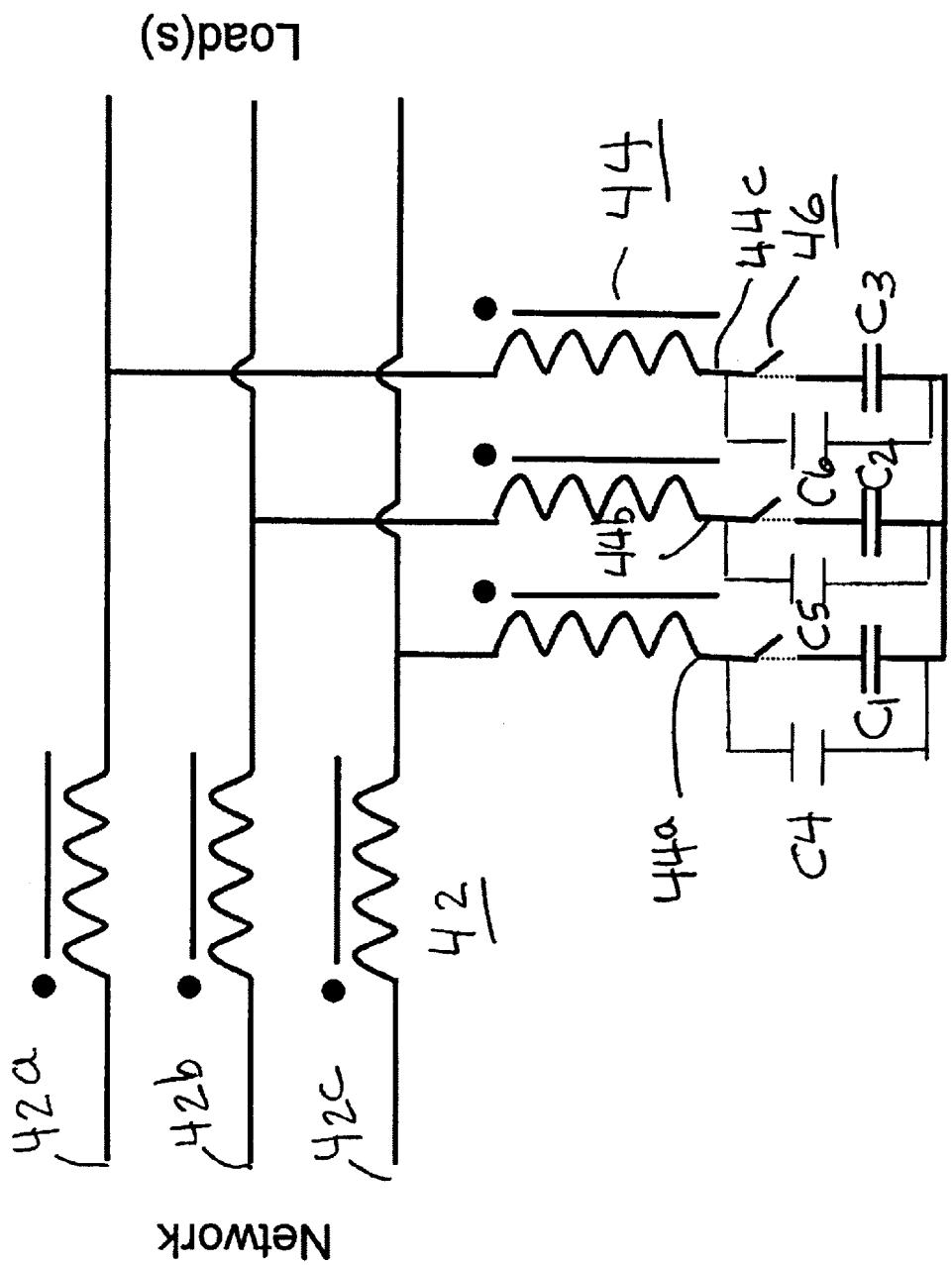
FIG. 2 shows a second embodiment for the harmonic mitigation filter of the present invention.

FIG. 2a shows for the harmonic mitigation filter 40 shown in FIG. 2 the connection of capacitors C1, C2 and C3 in the well known delta connection or configuration.

Figure 3:
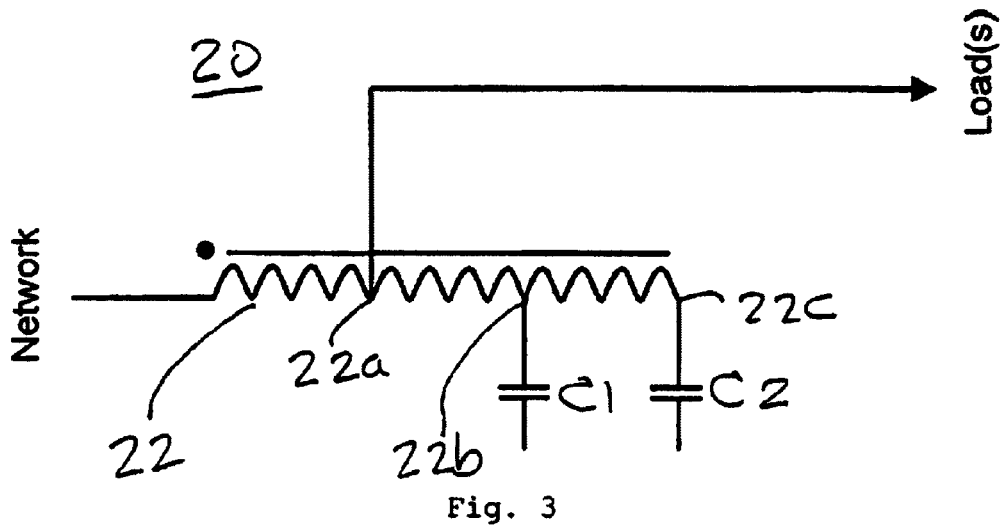
FIGS. 3 and 4 shown alternate embodiments for the embodiment of FIG. 1.
Figure 4:
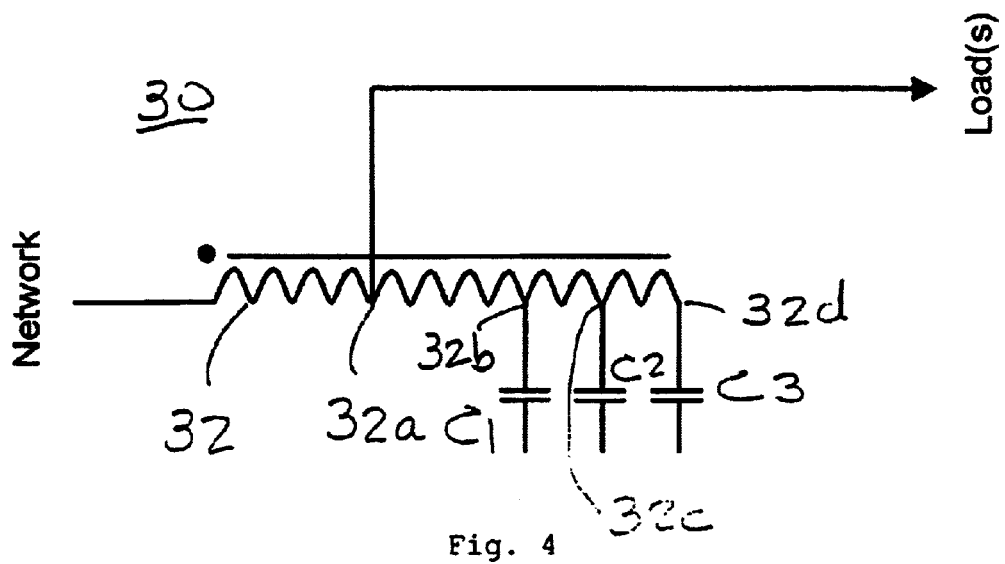

FIGS. 3 and 4 show alternate embodiments 20 and 30, respectively, for the filter shown in FIG. 1. For ease of illustration, only one of the three phases shown in FIG. 1 is shown in FIGS. 3 and 4. In the embodiment 20 of FIG. 3 there is a single winding 22 with two tappings 22a and 22b. The load is connected to tapping 22a and a capacitor C1 is connected to tapping 22b. A second capacitor C2 is connected to the end 22c of the single winding 22.

In the embodiment 30 there is also a single winding 32 that has three tappings 32a, 32b and 32c. The load is connected to tapping 32a, a capacitor C1 is connected to tapping 32b and a capacitor C2 is connected to tapping 32c. A third capacitor C3 is connected to the end 32d of the single winding 32.

Referring now to FIG. 2 there is shown another embodiment for the harmonic mitigation filter 40 for a three phase supply (not shown). In this embodiment two or more separate reactors (windings) 42 and 44 are used to construct the harmonic mitigation filter of the present invention. The power supply is connected to the start 42a, 42b and 42c of winding 42. Capacitors C1, C2 and C3 are connected to end 44a, 44b and 44c of winding 44 in either a delta or a y-connection.

As an option a switch 46 can be connected between the windings ends 44a, 44b and 44c to when open isolate the capacitors C1, C2 and C3. In addition capacitors C4, C5 and C6 can be connected to the winding ends in parallel with the series combination of switch 46 and capacitors C1, C2 and C3, respectively. It should be appreciated that while not shown in FIG. 1 a switch can also be connected between the end of the winding and each of the capacitors C1, C2 and C3 in that figure. In addition a capacitor can in the embodiment of FIG. 1 be connected to the winding end in parallel with the series combination of the switch and the capacitors C1, C2 and C3.

While the embodiment of FIG. 2 is electrically the same as the embodiment of FIG. 1 it does not have the advantages in manufacturing associated with the single winding embodiments shown in FIGS. 1, 3 and 4. In those embodiments the beginning and the end of the one winding 12, 22 or 32 is not isolated so the manufacturing is much easier as compared to embodiment of FIG. 2 where separate windings 42 and 44 are used. Further the embodiments of FIGS. 1, 3 and 4 save material as compared to the embodiment of FIG. 2. With similar electrical function the losses in the embodiments of FIGS. 1, 3 and 4 are smaller than the losses of the embodiment of FIG. 2 because of the reduced need of winding material in a single winding as compared to several windings.

As is shown in the embodiments in FIGS. 1–4, the harmonic mitigation filter of the present invention has either a reactor with at least one tapping or two separate reactors and at least one three-phase capacitor or three single-phase capacitors. The reactor(s) can also consist of three single-phase reactors. The inductance and capacitance are chosen to a particular electrical load so that harmonics caused to the supplying network are small.

The base frequency is typically 50 Hz or 60 Hz but it can be varied. The filter of the present invention is mitigating harmonics with broad band filtering. The harmonic mitigating capability is controlled with selected inductance and capacitance values. In the filter of the present invention the impedance to the supplying network and the load is higher than the impedance between the load and capacitors.

The reactor of each embodiment is not tied to a particular construction. The winding can be fabricated from aluminium or copper and can be wound from sheet or rounded wire or rectangular wire. The core usually be an iron core, powder core or ferrite core and can be an E-core or a UI-core etc. The connection of tappings can be either at terminals or at bus bars, with cables and they can be joint by welding or hard-soldering. The present invention is not dependent on the particular kinds of connections so other connecting ways are also possible.

As was described above, the capacitors used in the harmonic mitigating filter of the present invention can be connected to the end of the winding in either a delta or y-connection. The capacitors may be connected all the time or they can if desired be switched on/off by a switch as is shown in the embodiment of FIG. 2.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A device for mitigating harmonic currents generated in a power distribution system by an AC-powered load connected to said power distribution system, comprising:
    a single winding having a first end for connection to said power distribution system and a second end;
    a capacitor having an input connected to said second end; and
    a first tapping on said winding for direct connection to said AC-powered load;
    and wherein the inductance and the capacitance of said device are selected so that the total harmonic distortion in said power distribution system resulting from said AC-powered load is less than 5%.

2. The harmonic mitigating device of claim 1 further comprising at least one additional tapping on said winding between said first tapping and said winding end and a capacitor connected to said at least one additional tapping in parallel with said capacitor connected to said winding end.

3. The harmonic mitigating device of claim 1 further comprising a switch in series with said capacitor.

4. The harmonic mitigating device of claim 1 further comprising the series combination of a capacitor and a switch connected in parallel with said capacitor having an input connected to said second end.

5. The harmonic mitigating device of claim 1 wherein said load is an adjustable speed drive.

6. The harmonic mitigating device of claim 1 wherein said power distribution system is a three phase system and said first end of said single winding is connected to each of said three phases and said harmonic mitigating device further comprises a capacitor connected to said second end for each of said phases and a first tapping on said winding for each of said phases.

7. The harmonic mitigating device of claim 6 in which said capacitors are connected in a delta configuration.

8. The device of claim 1, wherein the impedance to said power distribution system and said AC-powered load is higher than the impedance between said AC-powered load and said capacitor.

9. A device for mitigating harmonic currents generated by an AC load connected to a power distribution system, comprising:
    two or more separate windings electrically connected to each other, one of said two or more windings for connection to said power distribution system;
    a capacitor having an input connected to the other of said two or more windings; and a first tapping at said electrical connection for direct connection to said AC load.

10. The harmonic mitigating device of claim 9 further comprising a switch in series with said capacitor.

11. The harmonic mitigating device of claim 9 further comprising the series combination of a capacitor and a switch connected in parallel with said capacitor connected to the other of said two or more windings.

12. The harmonic mitigating device of claim 9 wherein said load is an adjustable speed drive.

13. The harmonic mitigating device of claim 9 wherein said power distribution system is a three phase system and said one of said two or more windings connected to said power distribution systems is connected to each of said three phases and said harmonic mitigating device further comprises a capacitor connected to said other of said two or more windings for each of said phases and a first tapping at said electrical connection for each of said phases.

14. The harmonic mitigating device of claim 13 in which said capacitors are connected in a delta configuration.

15. The harmonic mitigating device of claim 9 wherein said power distribution system is an AC system.

16. In combination:

a power distribution system;

an AC-powered load connected to said power distribution system to receive AC power therefrom; and a device for mitigating harmonic currents generated in said power distribution system by said AC-powered load comprising:

a single winding having a first end connected to said power distribution system and a second end;

a capacitor having an input connected to said second end; and a first tapping on said winding directly connected to said AC-powered load.

17. In combination:

a power distribution system; and a device for mitigating harmonic currents generated by an AC load connected to said power distribution system comprising:

two or more separate windings electrically connected to each other, one of said two or more windings for connection to said power distribution system;

a capacitor having an input connected to the other of said two or more windings; and a first tapping at said electrical connection for direct connection to said AC load.

18. The combination of claim 17 wherein said power distribution system is an AC system.

19. The combination of claim 16, wherein said AC-powered load is non-linear, and wherein the inductance and the capacitance of said device for mitigating harmonic currents are selected so that the total harmonic distortion in said power distribution system resulting from said AC-powered load is less than 5%.

20. A The combination of claim 16, wherein said AC-powered load is an adjustable speed drive.

* * * * *